United States Patent
Kim et al.

(10) Patent No.: US 10,312,573 B2
(45) Date of Patent: Jun. 4, 2019

(54) MOBILE TERMINAL

(71) Applicant: LG ELECTRONICS INC., Seoul (KR)

(72) Inventors: Dongjin Kim, Seoul (KR); Yunmo Kang, Seoul (KR); Youngbae Kwon, Seoul (KR); Kangjae Jung, Seoul (KR); Hanphil Rhyu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/847,395

(22) Filed: Dec. 19, 2017

(65) Prior Publication Data

US 2019/0036210 A1    Jan. 31, 2019

(30) Foreign Application Priority Data

Jul. 28, 2017  (KR) .................. 10-2017-0096367

(51) Int. Cl.
   *H01Q 1/24* (2006.01)
   *H01Q 1/52* (2006.01)
   *H01Q 13/10* (2006.01)

(52) U.S. Cl.
   CPC .............. *H01Q 1/243* (2013.01); *H01Q 1/52* (2013.01); *H01Q 13/10* (2013.01)

(58) Field of Classification Search
   CPC .............................. H01Q 1/243; H01Q 13/10
   See application file for complete search history.

(56) References Cited

U.S. PATENT DOCUMENTS

| | | |
|---|---|---|
| 2015/0155614 A1 | 6/2015 | Youn et al. |
| 2017/0201010 A1 | 7/2017 | Kim et al. |

FOREIGN PATENT DOCUMENTS

| | | |
|---|---|---|
| KR | 10-2014-0031358 A | 3/2014 |
| KR | 10-2016-0104482 A | 9/2016 |
| KR | 10-2016-0125831 A | 11/2016 |

*Primary Examiner* — Robert Karacsony
(74) *Attorney, Agent, or Firm* — Birch, Stewart, Kolasch & Birch, LLP

(57) ABSTRACT

A mobile terminal can include a frame including a middle portion and an edge portion that includes conductive members and is located outside of the middle portion; a slot antenna including a slot with an open end, at least one of the conductive members, a ground unit and the middle portion of the frame; a display unit on a front surface of the middle portion; and a heat radiation sheet between a back surface of the display unit and the front surface of the middle portion, in which the back surface includes a first region overlapping the middle portion of the frame, a second region located outside of an edge of the middle portion of the frame without overlapping the middle portion, a third region overlapping the heat radiation sheet, and a fourth region including part of the second region that overlaps the slot without overlapping the heat radiation sheet.

20 Claims, 7 Drawing Sheets

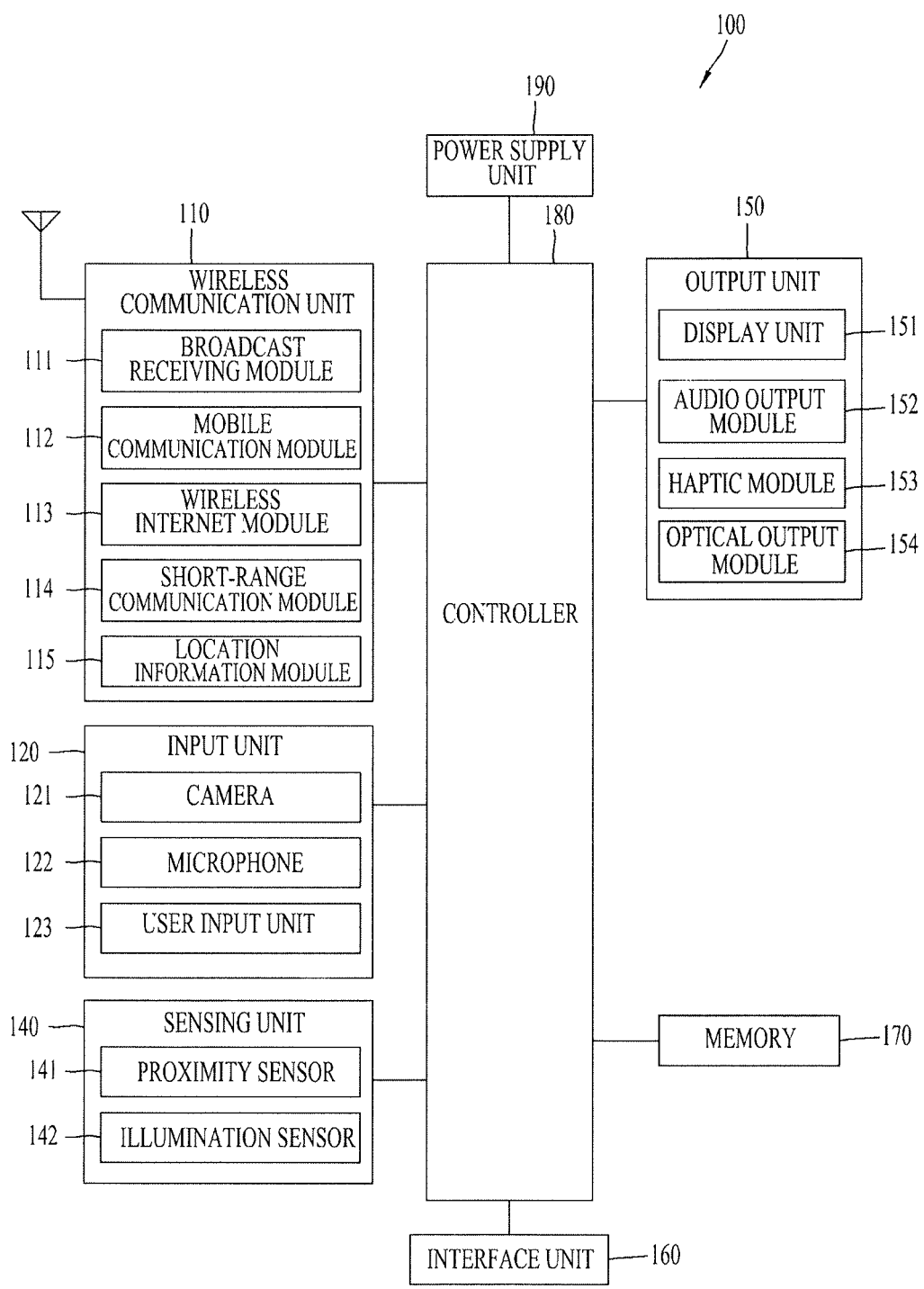

(a)

(b)

MOBILE TERMINAL

CROSS-REFERENCE TO RELATED APPLICATIONS

Pursuant to 35 U.S.C. § 119(a), this application claims priority to Korean Patent Application No. 10-2017-0096367 filed in the Republic of Korea on Jul. 28, 2017, the entire contents of which is hereby incorporated by reference in its entirety.

BACKGROUND OF THE DISCLOSURE

Field of the Disclosure

Embodiments of the present disclosure relate to a mobile terminal which is capable of securing antenna performance even when the size of a bezel is reduced.

Background of the Disclosure

Terminals may be generally classified as mobile/portable terminals or stationary terminals. Mobile terminals may also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

By extension, the functions become expanded, diverse wireless communication techniques are applied and data is transceived wirelessly. To use such diverse wireless communication methods, a plurality of antennas having different frequency characteristics, respectively, may be provided. Even more than two antennas operable in one frequency band may be provided and data may be transceived simultaneously or sequentially, to transceive more data.

In this instance, wireless communication is likely to be influenced by peripheral electronic components and cause mutual interference disadvantageously. There are ongoing studies and research about the distance with the other components and the distance and arrangement between the antennas.

SUMMARY OF THE DISCLOSURE

Accordingly, an object of the present invention is to address the above-noted and other problems and provide a mobile terminal which is capable of reducing the size of the bezel by preventing the antenna performance deterioration caused by a heat radiation sheet attached to a rear surface of a display unit.

Embodiments of the present disclosure may provide a mobile terminal including a middle frame; a main printed circuit board; a side case provided in a lateral surface of the middle frame and comprising a connecting portion connected with the middle frame and a plurality of conductive members spaced a distance apart from the middle frame; a display unit disposed on a front surface of the middle frame and comprising a first region overlapped with the middle frame and a second region not overlapped with the middle frame; a ground unit configured to connect the conductive members with a ground; and a heat radiation sheet configured to cover a rear surface of a third region provided in the display unit, in which the conductive members, the ground unit and the middle frame form a slot antenna comprising a slot having one open end, and a fourth region having no heat radiation sheet, corresponding to the slot, is overlapped with the second region to improve radiation performance of the slot antenna.

A slit can be formed between the conductive members, and the slit can be formed in an upper end and a lateral surface adjacent to the upper end of the mobile terminal, and the fourth region can be formed adjacent to the slit to improve the radiation performance of the slot antenna.

The mobile terminal can further include a first flexible printed circuit board configured to connect the display unit with the main printed circuit board and penetrate a space formed between the conductive members and the middle frame, in which a corresponding location to the first flexible printed circuit board belongs to the third region where the heat radiation sheet is formed.

The mobile terminal can further include a touch sensor provided in a front surface of the display unit; and a second flexible printed circuit board configured to connect the touch sensor with the main printed circuit board and penetrate a space formed between the conductive members and the middle frame, in which a corresponding location to the second flexible printed circuit board belongs to the third region where the heat radiation sheet is formed.

The second flexible printed circuit board can comprise a first portion bent toward a rear surface one time to contact with the heat radiation sheet; a second portion bent toward the rear surface from the first portion one time to be connected with a main printed circuit board located in a rear surface of the middle frame; and a conduction unit provided in the first portion and configured to contact with the heat radiation sheet.

The second flexile printed circuit board can pass between the conductive members located in a lateral surface of the mobile terminal and the middle frame.

The third region can be spaced 6 mm or more apart from the conductive members.

The fourth region may be not overlapped with the middle frame.

The display unit can comprise OLED (Organic Light Emitting Diode).

The side case and the middle frame can be integrally formed with each other as one body.

According to the embodiments of the present disclosure, the mobile terminal can reduce the size of the bezel by preventing the deterioration of the antenna performance which might be generated by the heat radiation sheet attached to the rear surface of the display unit.

Furthermore, the mobile terminal is capable of preventing the antenna performance from becoming variable due to a deformation of the flexible printed circuit board penetrating the antenna.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention. In the drawings:

FIG. 1A is a block diagram of a mobile terminal in accordance with an embodiment of the present disclosure;

DESCRIPTION OF SPECIFIC EMBODIMENTS

Description will now be given in detail according to example embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein can be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings can also be applied to stationary terminals such as digital TV, desktop computers, and the like.

Figure 1B:
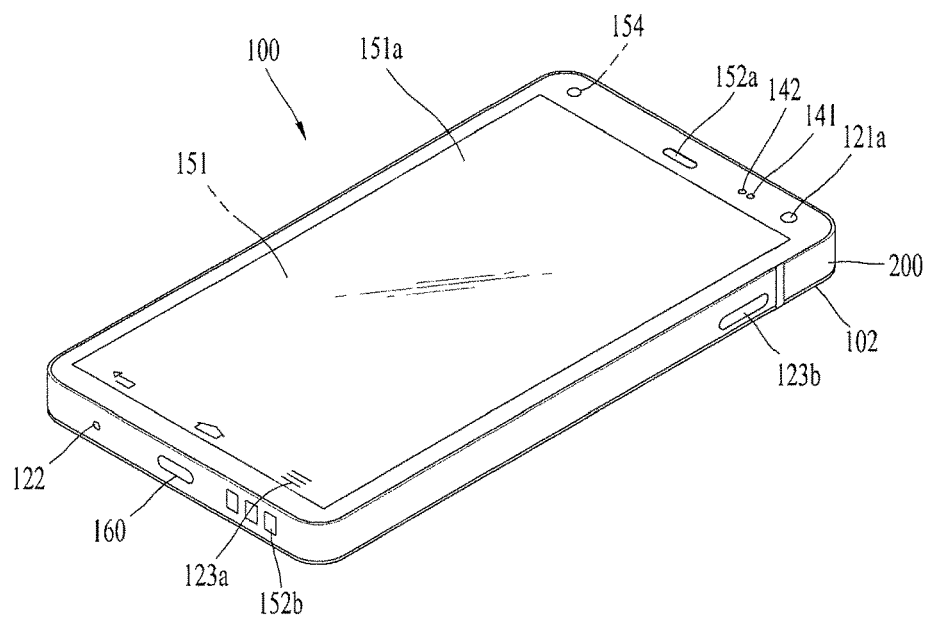
FIGS. 1B and 1C are conceptual views of one example of the mobile terminal, viewed from different directions according to an embodiment.
Figure 1C:
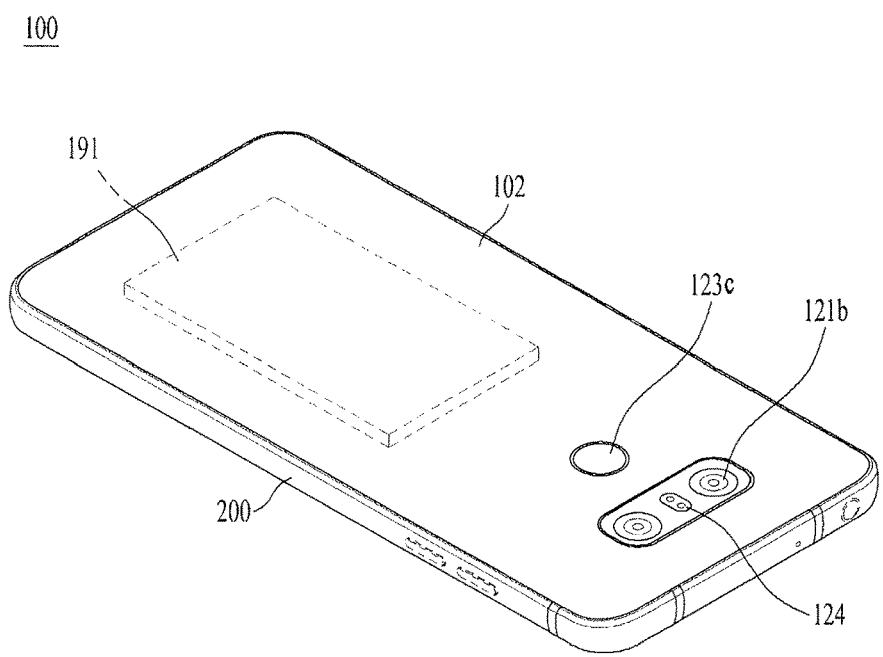

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190.

Implementing all of the illustrated components in FIG. 1A is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like.

For example, the sensing unit 140 can alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 can be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 can have an inter-layered structure or an integrated structure with a touch sensor in order to facilitate a touch screen. The touch screen can provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, can include any of wired or wireless ports, external power supply ports, wired or wireless data ports, memory card ports, ports for connecting a device having an identification module, audio input/output (I/O) ports, video I/O ports, earphone ports, and the like. In some instances, the mobile terminal 100 can perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs can be downloaded from an external server via wireless communication. Other application programs can be installed within the mobile terminal 100 at time of manufacturing or shipping, which is usually typical for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 can include a battery, and the battery can be embedded in the terminal body, or detachable from the terminal body.

Some or more of the components can be operated cooperatively to embody an operation, control or a control method of the mobile terminal in accordance with embodiments of the present disclosure. Also, the operation, control or control method of the mobile terminal can be realized on the mobile terminal by driving of one or more application programs stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module can be internally or externally coupled to the mobile terminal 100. The wireless Internet module 113 can transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 can transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 can cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, a mobile terminal (which may be configured similarly to mobile terminal 100) can be a wearable device, for example, a smart watch, a smart glass or a head mounted display (HMD), which can exchange data with the mobile terminal 100 (or otherwise cooperate with the mobile terminal 100). The short-range communication module 114 can sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some instances, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor can allow detection of a touch of a physical object with respect to a 3D stereoscopic image. The photo sensor may be laminated on, or overlapped with, the display device. The photo sensor can be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 can be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 can be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 can store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives an applied external power and internal power by the control of the controller 180 and supplies a power which is needed in the operations of the components. The power supply unit 190 may include a battery. The battery may be a rechargeable built-in battery and detachably loaded in the terminal body.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 can alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal 100 to at least one of the aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case can be additionally positioned between the front case 101 and the rear case 102.

The display unit 151 is shown located on the front side of the terminal body to output information. As illustrated, a window 151a of the display unit 151 can be mounted to the front case 101 to form the front surface of the terminal body together with the front case 101.

For the strength and rigidity, the mobile terminal 100 can include a middle frame (290, see FIG. 3) configured to support a rear surface of the display unit 151. The middle frame 290 may include a metallic material for strength and it can function as a large-scaled ground having a conductive material, to be connected with the components for the ground of the electronic components such as the antenna.

The middle frame 290 can be integrally formed with a front case disposed in a front surface or a side case 200 disposed in a lateral surface of the body, configured not to be exposed outside.

As the multimedia functions are expanded, the display unit 151 tends to become larger and the bezel located around the display unit tends to become larger. Especially, some space should be secured in the upper end to locate the camera 121, the audio output unit 152 and the proximity sensor 141 therein and a physical button should be arranged in the lower end. Accordingly, the size expansion of the display unit 151 is limited.

However, each electronic component is minimized and a user input unit 123 using a soft key is realized instead of the physical button recently. If needed, the soft key is output on the screen. If it is not needed, the soft key disappears to enlarge the screen more.

In some embodiments, electronic components can also be mounted to the rear case 102. Examples of such electronic components include a detachable battery 191, an identification module, a memory card, and the like. Rear cover 103 is shown covering the electronic components, and this cover can be detachably coupled to the rear case 102. Therefore, when the rear cover 103 is detached from the rear case 102, the electronic components mounted to the rear case 102 are externally exposed.

The cases 101, 102, 103 can be formed by injection-molding synthetic resin or may be formed of a metal, for example, stainless steel (STS), aluminum (Al), titanium (Ti), or the like.

The mobile terminal 100 in accordance with the present embodiment includes the side case 200 which surrounds a lateral surface. The side case 200 can include a metallic material. For wireless communication performance, a predetermined area of the side case CAN include a non-metallic material. As shown in FIGS. 1B and 1C, the side case 200 CAN include a plurality of conductive members (210, see FIG. 2) formed of a conductive material such as metal; and a slit (220, see FIG. 3) arranged between the conductive members.

As an alternative to the example in which the plurality of cases form an inner space for accommodating components, the mobile terminal 100 can be configured such that one case forms the inner space. In this example, a mobile terminal 100 having a uni-body is formed in such a manner that synthetic resin or metal extends from a side surface to a rear surface.

If desired, the mobile terminal 100 can include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 can include the display unit 151; the first and second audio output units 152a and 152b; the proximity sensor 141; the illuminance sensor 142; the optical output unit 154; the first and second cameras 121a and 121b; the first and second manipulation units 123a and 123b; the microphone 122; and the interface unit 160.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body. Also, alternative arrangements are possible and within the teachings of the instant disclosure. Some components may be omitted or rearranged. For example, the first manipulation unit 123a can be located on another surface of the terminal body, and the second audio output module 152b can be located on the side surface of the terminal body.

The display unit 151 is generally configured to output information processed in the mobile terminal 100. For example, the display unit 151 can display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 can be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio sound to be released along or out of an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b can also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b, which is near a third manipulation unit 123c. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication can be located on the terminal body. The antenna can be installed in the terminal body or formed by the case. For example, an antenna which configures a part of the broadcast receiving module 111 (see FIG. 1A) can be retractable into the terminal body. Alternatively, an antenna can be formed using a film attached to an inner surface of the rear cover 103, or a case that includes a conductive material.

A power supply unit 190 for supplying power to the mobile terminal 100 can include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging can be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 can be detachably coupled to the rear case 102.

An accessory for protecting an appearance or assisting or extending the functions of the mobile terminal 100 can be provided on the mobile terminal 100. As one example of an accessory, a cover or pouch for covering or accommodating at least one surface of the mobile terminal 100 can be provided. The cover or pouch can cooperate with the display unit 151 to extend the function of the mobile terminal 100. Another example of the accessory is a touch pen for assisting or extending a touch input to a touch screen Hereinafter, a control method, which can be realized in the mobile terminal having the structure mentioned above, and related embodiments will be described referring to the accompanying drawings. As the present features may be embodied in several forms without departing from the characteristics thereof, it should also be understood that the above-described embodiments are not limited by any of the details of the foregoing description.

As the multimedia function becomes a more desired factor, the wireless communication technique implemented in the mobile terminal is performed in diverse types, for example, in short range, in a remove range or between devices. Frequency bands used in this instance are different from each other and a different conductive member should be used.

With the development of wireless communication techniques recently, massive data is transceived. To support such massive data transceiving, MIMO (Multiple Input Multiple Output) technique is used which is configured to transceiver signals in the same frequency band simultaneously or sequentially. Such MIMO technique transmits data through various channels by increasing antennas of a base station and the antennas of the mobile terminal by two or more and detects the received signals received from the channels at a receiving end, to reduce interference and lower each transmission velocity. To apply such MIOM technique, the number of the conductive members in the mobile terminal may increase with the limited-size.

Each conductive member is configured to form an electromagnetic field and then exchange mutual influence with its neighboring conductive member, so that interference might be generated between each two neighboring conductive members only to deteriorate the performance of the wireless signals. Accordingly, the conductive members can be attached to the case or the case can be used as the conductive member.

As the display unit becomes larger, the bezel located in right and left edges of the mobile terminal becomes close to zero and it is difficult for the side case located in the right and left sides of the display unit to function as the conductive member. Accordingly, the upper and lower case portions can be realized as the conductive member.

Figure 2:
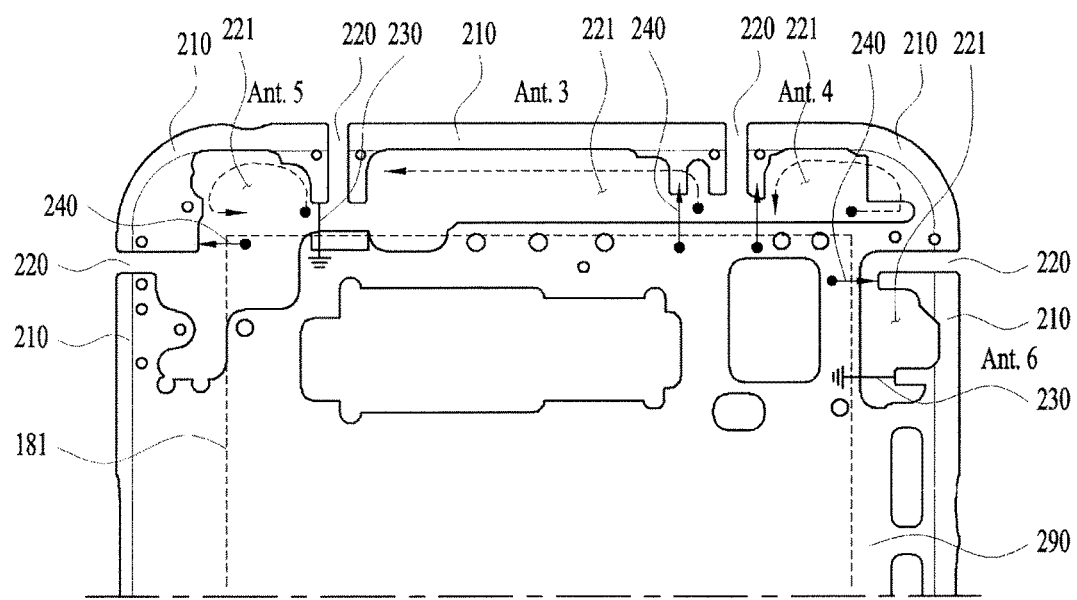
FIG. 2 is a diagram illustrating an antenna which is formed by a side case and a middle frame of the mobile terminal in accordance with one embodiment.

FIG. 2 is a diagram illustrating antennas (Ant 3, Ant 4, Ant 5 and Ant 6) formed by a side case 200 and a middle frame 290 of the mobile terminal 100 in accordance with one embodiment. FIG. 2 shows the side case 200 including the middle frame 290 located in the terminal body and a side case 200 having a plurality of conductive members 210 spaced a preset distance from the middle frame 290.

The side case 200 includes a plurality of conductive members 210 having a conductive material such as metal. Each conductive member 210 can have a different length according to the wavelength of a transceived signal. A space (or a slit) between the conductive members 210 is filled with a non-conductive material (see FIG. 2) such as an injection mold so the side case can be integrally formed as one body.

The conductive member 210 is connected with the middle frame 290 or the main printed circuit board 181 to be grounded. A feeding line 240 connected with the conductive member 210 can be connected with the main printed circuit board 181 to supply power. Once provided with the power via the feeding line 240, the corresponding antenna (Ant3, Ant4, Ant5 and Ant6) can form an electromagnetic field and transceive a signal. The conductive members 210, a ground unit 230 and the middle frame 290 are arranged in a slot shape with one blocked end and the other end open to realize a slot antenna (Ant3, Ant4, Ant5 and Ant6).

The slot antenna is configured to radiate a radio wave when electric currents flow along a slot portion 221. When an electronic component including a conductive material is arranged in the slot portion 221, the radiation performance of the slot antenna might be deteriorated disadvantageously.

To minimize the influence of the other electronic components on the slot antenna, the conductive members 210 can be arranged in an upper or lower lateral surface, rather than a left or right lateral surface of the mobile terminal 100.

The arrangement of the camera, the audio output module and the diverse sensors arranged in an upper bezel (an edge portion of the display unit 151 disposed in the front surface) can be changed in size to enlarge the display unit 151. The size of the upper bezel, for example, 13 mm can be reduced by half or less.

The middle frame 290 disposed in a rear surface of the display unit 151 is formed of a conductive material and configured to support the display unit 151 and provide the mobile terminal with strength and also function as the ground. The size and shape of the middle frame 290 may not be precisely equal to those of the display unit 151. Recently, the mobile terminal having a design with a minimized bezel is released so that the display unit 151 becomes larger and the bezel becomes smaller by omitting the receiver or camera disposed in the upper bezel.

As the display unit 151 becomes larger, the middle frame 290 becomes smaller. As the middle frame 290 becomes larger, the distance arranged between the middle frame 290 and the conductive member becomes short enough to deteriorate the performance of the conductive members 210.

As shown in FIG. 2, the middle frame 290 is formed smaller than the display unit 151 to prevent the deterioration of the antenna performance which might be generated by the closer distance between the middle frame 290 and the side case 200. In other words, the display unit 151 includes a first region having a rear surface covered by the middle frame 290; and a second region which is larger than the middle frame 290 to be projected outside of the middle frame 290. The second region refers to the part of the back surface of the display unit that is not overlapped with the middle frame 290 (e.g., the second region is the portion of the display unit that extends past the outer edges of the middle frame).

Figure 3:
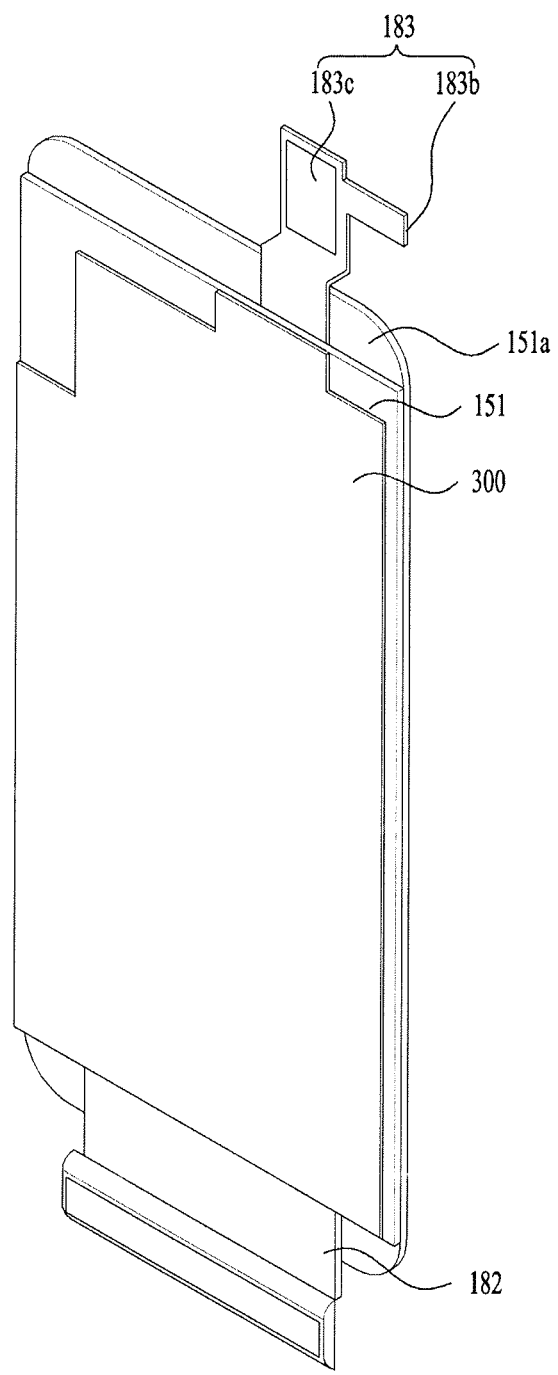
FIG. 3 is a diagram illustrating a rear surface of a display unit provided in the mobile terminal according to an embodiment.

FIG. 3 is a diagram illustrating a rear surface of the display unit 151 provided in the mobile terminal 100. The display unit 151 can include a first flexible printed circuit board 182 configured to provide visual information to the user and receive a signal about an image. The first flexible printed circuit board 182 is extended from an end of the display unit disposed in a front surface of the middle frame 290 and bent toward the rear surface one time to be connected with the main printed circuit board 181 disposed in the rear surface of the middle frame 290. The first flexible printed circuit board 182 is located in the upper or lower end of the mobile terminal. In the present embodiment, the first printed circuit board 182 is located in the lower end of the mobile terminal 100.

A window 151a is disposed on the front surface of the display unit 151 to protect the front surface and a touch sensor can be provided between the window 151a and the display unit 151 or integrally formed with the window as one body. The touch sensor as the device configured to sense the user's touch input, corresponding to the user interface (UI) output on the display unit 151 can sense touch by sensing the variation of the displacement difference of the user's touch points.

A second flexible printed circuit board 183 can be used in transmitting the information acquired from the touch sensor to the main printed circuit board 181. The second flexible printed circuit board can be extended in the reverse direction or opposite direction with respect to the first flexible printed circuit board 182 to utilize space. The second flexible printed circuit board 183 can be also bent to be connected with the main printed circuit board 181 located in the rear surface of the middle frame 290.

A heat radiation sheet 300 can be provided in or at the rear surface of the display unit 151 to radiate the heat generated in the display unit 151. The heat radiation sheet 300 can include a conductive material having a high heat conductivity such as copper and it can have a thin film shape. The heat radiation sheet 300 is in contact with the middle frame 290 and configured to transmit the heat to the middle frame 290 (e.g., between the display and the middle frame). The heat radiation sheet 300 has a higher heat conductivity than the middle frame 290 and disperses the heat more quickly.

An OLED (Organic Light Emit Diode) of the display unit 151 is luminescent without auxiliary light sources to generate heat, so the heat radiation sheet 300 can be used as an element to dissipate heat generated by the OLEDs.

The heat radiation sheet 300 includes the conductive material. Because of this, when the heat radiation sheet 300 is located in the slot portion 221 of the slot antenna (Ant3, Ant4, Ant5 and Ant6) formed by the conductive members 210 and the ground of the middle frame 290, the heat radiation sheet 300 may deteriorate the performance of the antenna, even though the size of the middle frame 290 is reduced. To solve such a disadvantage, the heat radiation sheet 300 overlapped with the slot antenna (Ant3, Ant4, Ant5 and Ant6) may be omitted (e.g., radiation sheet 300 includes one or more cutout portions so that it is does not overlap with the antenna).

Figure 4:
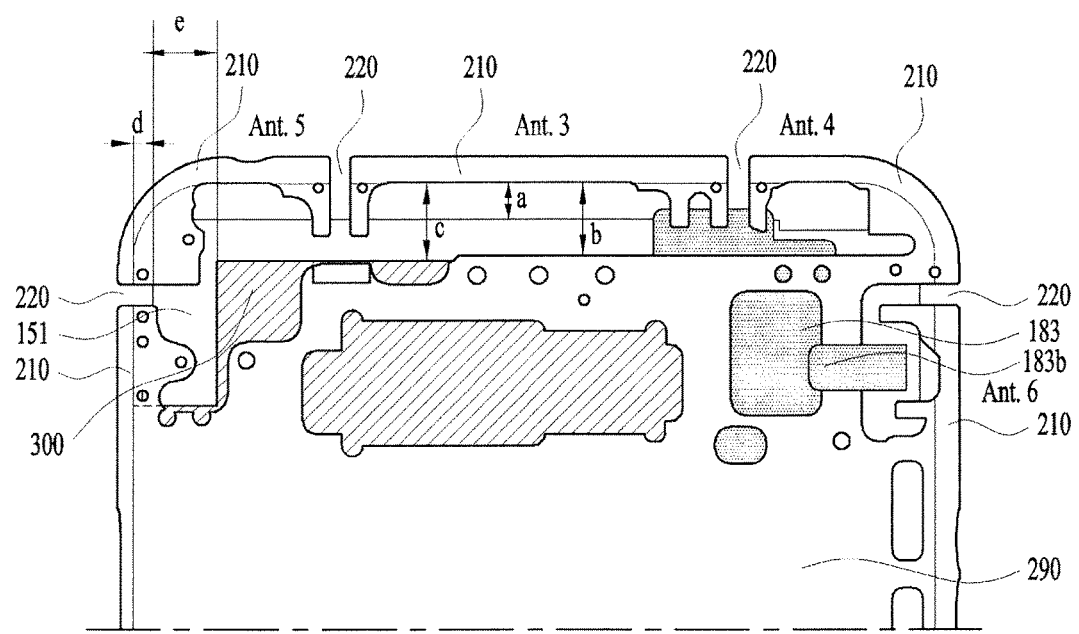
FIG. 4 is a diagram illustrating a state where the side case, the middle frame and the display unit of the mobile terminal are overlapped with each other according to an embodiment.

FIG. 4 is a diagram illustrating a state where the side case 200, the middle frame 290 and the display unit 151 of the mobile terminal 100 are overlapped with each other. The display unit 151 includes the first region covered by the middle frame 290; and the second region is larger than the middle frame 290 and does not overlap with the middle frame 290 to be exposed between the side case 200 and the middle frame 290. As mentioned above, the overlapped portion with the slot antenna can be removed or cutout from the heat radiation sheet 300 disposed in the rear surface of the display unit 151 for enhancing the performance of the slot antenna. The rear surface of the display unit 151 can include a third region covered by the heat radiation sheet 300; and a fourth region exposed, not covered by the heat radiation sheet 300. The fourth region can be overlapped with the slot portion 2210 of the slot antenna not to deteriorate the antenna performance. In other words, the back surface of the display unit can be viewed similar to a venn diagram, in which the fourth region can include part the second region that does not overlap with the third region, in which the second region is the part of the back surface of the display unit that does not overlap with the middle frame and the third region the part of the back surface of the display unit that overlaps with the heat radiation sheet.

The slot portion 221 refers to the space formed between the middle frame and the conductive members 210 and can be overlapped with the second and fourth regions that are not covered by the middle frame 290 in the rear surface of the display unit.

The middle frame 290 can be partially omitted or have cutout or notched portions, in order to secure the space where the camera or the interface unit speaker is installed, so that the second region of the display unit 151 not covered by the middle frame 290 can be related with the antenna performance and can be related to securing enough space for other components.

The portion of the heat radiation sheet 300 is omitted or cutout (a fourth region) to minimize the influence of the heat radiation sheet 300 on the antenna so that the portion (the fourth region) can be overlapped with the slot portion 221 (e.g., the cutout portion or absence of the heat radiation sheet 300 overlaps with the slot portion 221).

Considering the installed electronic components, the middle frame 290 can have uneven portions formed in an end, which are not flat. The heat radiation sheet 300 can be formed straight for convenience sake but can also be uneven. As shown in FIG. 4, the distance (a) from the conductive members 210 to the end of the display unit 151 is less than the distance (b) to the middle frame 290. The distance (c) from the conductive members 210 to the heat radiation sheet 300 can be larger or smaller than or equal to the distance (b) from the side case 200 to the middle frame 290.

As the distance (c) from the conductive members 210 to the heat radiation sheet 300 (or the distance from the conductive members 210 to the third region) becomes larger, the antenna performance becomes better, but the heat radiation performance becomes worse. It is preferred that the portion of the heat radiation sheet 300 which influences a slot is removed or cutout. Based on the result of the experiments, the performance is enhanced considerably when the heat radiation sheet 300 is spaced 6 mm apart from the slot. It is preferred that the distance (c) between the conductive members 210 and the heat radiation sheet 300 is 6 mm.

The size of the display unit can be increased as much as the fourth region where the heat radiation sheet 300 is omitted, so that the size of the bezel can be reduced more.

The heat radiation sheet 300 is cutout at a portion corresponding to a fifth antenna to radiate via the slit 220 located in the lateral of the mobile terminal. The width (e) of the fourth region from a side end of the display unit 151 to a side end of the heat radiation sheet 300 is larger than the width (c-a) of the fourth region from an upper end of the display unit 151 to an upper end of the radiation sheet 300. The upper end of the display unit 151 is spaced apart (a) from the conductive members 210 and the right and left sides of the display unit 151 are close to the distance (d) of the conductive members 210. Accordingly, the side portion of the fourth region is wider than the upper portion of the fourth region.

Heat radiation is intensively performed in an open portion of the slot antenna, in other words, the slit 220, so that the fourth region having no heat radiation sheet can be overlapped with the slit.

Figure 5:
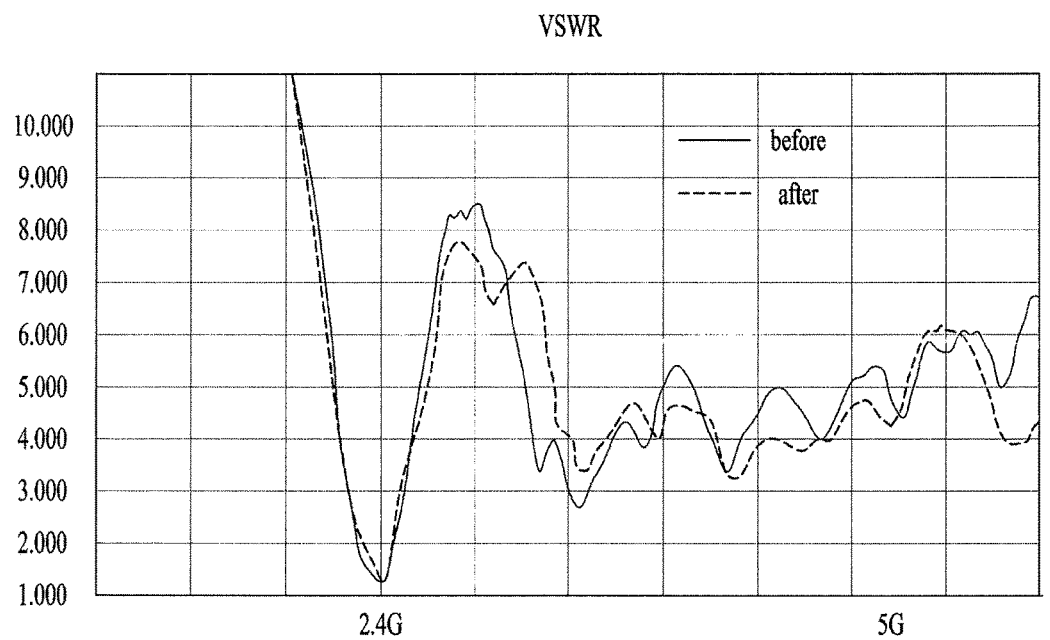
FIG. 5 includes graph (a) and graph (b) to compare the performance when a heat radiation sheet is removed from the mobile terminal and the performance when it is kept.
Figure 5:
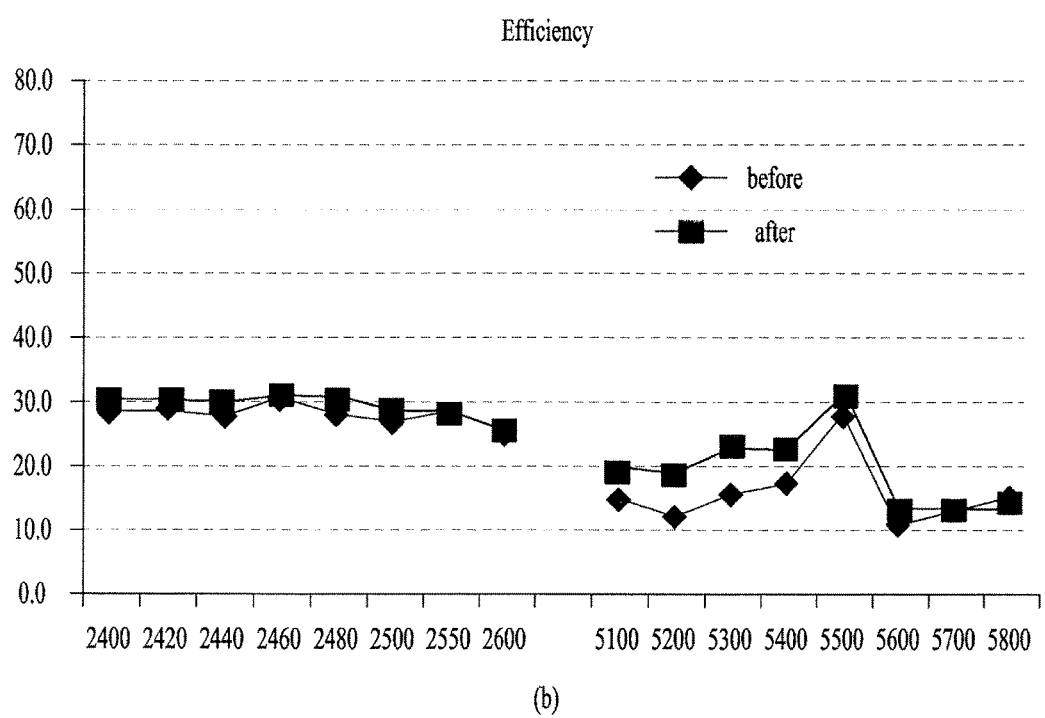

FIG. 5 includes graph (a) and graph (b) to compare the performance when a heat radiation sheet is removed from the mobile terminal 100 (e.g., when the heat radiation sheet includes a notched or cutout portion) and the performance when the heat radiation sheet is kept (e.g., when the heat radiation sheet is unaltered and has a rectangular shape or straight edges). Graph (a) in FIG. 5 shows VSWR (Voltage Standing Wave Ratio) which is a calculated ratio of reflected signals to output signals. As the ratio gets closer to 1, there are less reflected signals and the performance gets better. VSWR is a little closer to 1 after the heat radiation sheet 300 is removed at 2.4 G and 5 G than before heat radiation sheet 300 removed in that area, in other words, when the heat radiation sheet 300 covers the portion corresponding to the antenna (the fourth region).

Graph (b) in FIG. 5 shows the antenna performance. As the graph lines get closer to 100%, in other words, when a line or data point is located higher on the graph, the antenna performance gets better. The heat radiation efficiency is higher after the heat radiation sheet 300 is removed than when compared to when the heat radiation sheet 300 covers the fourth region corresponding to the antenna (e.g., before a corner of the radiation sheet was removed).

Figure 6:
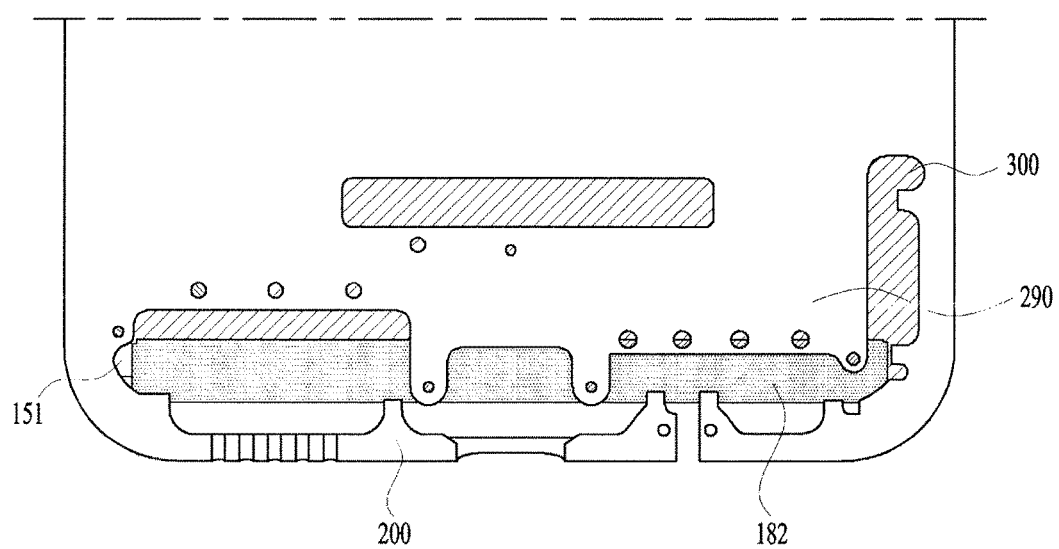
FIG. 6 is a diagram illustrating a display unit provided in a lower end of the mobile terminal and the middle frame according to an embodiment.

FIG. 6 is a diagram illustrating the display unit 151 provided in the lower end of the mobile terminal 100 and the middle frame 290. The portion where the first flexible printed circuit board 182 is connected with the display unit 151 shown in FIG. 6 and the portion where the second flexible printed circuit board 183 is connected with the touch sensor may have little effect of omitting the heat radiation sheet 300 and the heat radiation sheet 300 is not limited from those regions for the heat radiation performance.

Referring to FIGS. 3 and 4, the heat radiation sheet 300 is removed from the portions corresponding to or overlapping with the antenna 3, 4 and 5 but the heat radiation sheet 300 is arranged in the portion corresponding to or overlapping with the antenna 6. More specifically, the portion corresponding to the antenna 6 includes the third region covered by the heat radiation sheet 300.

As shown in FIG. 4, the second flexible printed circuit board 183 is configured to transmit the signal of the touch sensor, and the end of the second flexible printed circuit board 183b is connected with the main printed circuit board 181 disposed on the rear surface of the middle frame 290, penetrating the slot of the antenna 6. In other words, the second flexible printed circuit board 183 affects the performance of the antenna 6 and the bent portion of the second flexible printed circuit board 183 is changed in positions or moved around according to the force or impact applied to the mobile terminal 100. When the location of the second flexible printed circuit board 183 is changed or moved, the performance of the antenna 6 is changed disadvantageously.

To solve the disadvantage, a conduction unit 183c can be provided adjacent to the portion penetrating the slot of the antenna 6 of the second flexible printed circuit board 183 and configured to facilitate electrical contact between the second flexible printed circuit board 183 and the heat radiation sheet 300, so that the influence of the second flexible printed circuit board 183 on the antenna 6 even when the position of the second flexible printed circuit board 183 is variable and moves around. When the conduction unit 183c contacts with the heat radiation sheet 300, the voltage is 0V. Then, even though the position of the second flexible printed circuit board 183 is varied or moves around, the electromagnetic field is not changed much in the portion near the conduction unit 183c. Accordingly, the variation of the performance of the antenna 6 according to the variation of the second flexible printed circuit board position can be minimized.

It is desirable to improve the antenna performance and also to keep the antenna performance uniform and stable. In the present embodiment, the heat radiation sheet 300 is disposed in the portion corresponding to the antenna 6 to ground the second flexible printed circuit board 183.

As described above, the mobile terminal 100 in accordance with the embodiments is capable of improving the performance of the antenna by minimizing the influence of the heat radiation sheet 300 disposed on the rear surface of the display unit on the antenna, even when the bezel is minimized.

Furthermore, the mobile terminal is capable of reducing the size of the bezel by preventing the deterioration of the antenna performance which might be generated by the heat radiation sheet attached to the rear surface of the display unit.

Still further, the mobile terminal is capable of maintaining stable antenna performance by preventing the antenna performance from becoming variable according to the deformation of the flexible printed circuit board penetrating the antenna.

As the present features can be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
    a frame including a middle portion and an edge portion, wherein the edge portion includes a plurality of conductive members and the edge portion is located outside of the middle portion and exposed to an outside of the mobile terminal;
    a ground unit configured to connect the plurality of conductive members to ground;
    a slot antenna comprising a slot with an open end, and including at least one of the plurality of conductive members, the ground unit and the middle portion of the frame;
    a display unit disposed on a front surface of the middle portion of the frame; and
    a heat radiation sheet disposed between a back surface of the display unit and the front surface of the middle portion of the frame,
    wherein the back surface of the display unit has at least four regions including:
        a first region overlapping with the middle portion of the frame,
        a second region located outside of an edge of the middle portion of the frame without overlapping the middle portion of the frame,
        a third region overlapping with the heat radiation sheet, and
        a fourth region including a portion of the second region that overlaps with the slot of the slot antenna without overlapping with the heat radiation sheet for improving radiation performance of the slot antenna.

2. The mobile terminal of claim 1, wherein a slit is disposed between two of the plurality of conductive members,
    wherein the slit is in an upper end of the mobile terminal and a lateral surface of the mobile terminal adjacent to the upper end of the mobile terminal, and
    wherein the fourth region is adjacent to the slit for improving the radiation performance of the slot antenna.

3. The mobile terminal of claim 1, further comprising:
    a first flexible printed circuit board configured to connect the display unit with a main printed circuit board and penetrate through a space between the plurality of conductive members and the middle portion of the frame, wherein the first flexible printed circuit board is disposed in the third region that is overlapped the heat radiation sheet.

4. The mobile terminal of claim 1, further comprising:
a touch sensor on a front surface of the display unit; and
a second flexible printed circuit board configured to connect the touch sensor with a main printed circuit board and penetrate a space between the plurality of conductive members and the middle portion of the frame,
wherein the second flexible printed circuit board is disposed in the third region that is overlapped the heat radiation sheet.

5. The mobile terminal of claim 4, wherein the second flexible printed circuit board comprises:
a first portion bent toward a rear surface of the heat radiation sheet and contacting with the heat radiation sheet;
a second portion bent toward the rear surface of the heat radiation sheet and connected to a main printed circuit board located in a rear surface of the middle portion of the frame; and
a conduction unit disposed in the first portion and configured to contact with the heat radiation sheet.

6. The mobile terminal of claim 4, wherein a portion of the second flexile printed circuit board is disposed between the plurality of conductive members located in a lateral surface of the mobile terminal and the middle portion of the frame.

7. The mobile terminal of claim 1, wherein the third region is spaced 6 mm or more apart from an edge of at least one of the plurality of conductive members.

8. The mobile terminal of claim 1, wherein the fourth region overlaps with at least four antennas.

9. The mobile terminal of claim 1, wherein the display unit comprises a plurality of OLEDs (Organic Light Emitting Diodes).

10. The mobile terminal of claim 1, wherein the edge portion and the middle portion of the frame are integrally formed with each other as one body.

11. The mobile terminal of claim 1, wherein the heat radiation sheet has a rectangular shape with a cutout portion at a corner of the rectangular shape, and
wherein the cutout portion of the heat radiation sheet overlaps with the fourth region of the back surface of the display unit.

12. The mobile terminal of claim 1, wherein the display unit, the heat radiation sheet and the middle portion of the frame are sequentially stacked on each other, and
wherein the display unit is wider than the heat radiation sheet, and the heat radiation sheet includes a portion that extends past an outer edge of the middle portion of the frame.

13. The mobile terminal of claim 1, wherein a slit is disposed in the edge portion and between at least two of the plurality of conductive members, and
wherein at least a portion of the slit overlaps with a portion of the back surface of the display unit without overlapping with the heat radiation sheet and the middle portion of the frame.

14. The mobile terminal of claim 1, wherein the fourth region of the back surface of the display unit includes an "L" shaped portion that corresponds to a corner of the display unit.

15. The mobile terminal of claim 14, wherein the heat radiation sheet has a rectangular shape with a cutout portion at a corner of the rectangular shape, and
wherein the "L" shaped portion of the fourth region corresponds to the cutout portion of the heat radiation sheet.

16. A device comprising:
a frame including a middle portion and an edge portion, wherein the edge portion includes a plurality of conductive members and the edge portion is located outside of the middle portion and exposed to an outside of the mobile terminal;
a slot antenna comprising a slot with an open end, and including a portion of at least one of the plurality of conductive members and a portion of the middle portion of the frame;
a display unit disposed on a front surface of the middle portion of the frame; and
a heat radiation sheet disposed between a back surface of the display unit and the front surface of the middle portion of the frame,
wherein the back surface of the display unit has at least four regions including:
a first region overlapping with the middle portion of the frame,
a second region located outside of an edge of the middle portion of the frame without overlapping the frame,
a third region overlapping with the heat radiation sheet, and
a fourth region overlapping with the slot of the slot antenna and not overlapping with the heat radiation sheet.

17. The device of claim 16, wherein a slit is disposed between at least two of the plurality of conductive members, and
wherein the fourth region is adjacent to the slit for improving the radiation performance of the slot antenna.

18. The device of claim 16, further comprising:
a first flexible printed circuit board configured to connect the display unit with a main printed circuit board,
wherein at least a portion of the first flexible printed circuit board overlaps with the third region.

19. The device of claim 18, further comprising:
a touch sensor; and
a second flexible printed circuit board configured to connect the touch sensor with the main printed circuit board,
wherein the first flexible printed circuit board and the second flexible printed circuit board are disposed at opposite ends of the display unit.

20. The device of claim 16, wherein the heat radiation sheet includes a metal.

* * * * *